United States Patent [19]

McDermott

[11] 3,835,656

[45] Sept. 17, 1974

[54] METHOD AND APPARATUS FOR SUPPLYING TEMPORARY BUOYANCY TO AN UNDERWATER PIPELINE

[75] Inventor: David C. McDermott, Houston, Tex.

[73] Assignee: Shell Oil Company, Houston, Tex.

[22] Filed: Sept. 1, 1972

[21] Appl. No.: 285,945

[52] U.S. Cl. ................................. 61/72.3
[51] Int. Cl. .................... B63b 35/04, F16l 1/00
[58] Field of Search ............... 61/46.5, 72.1, 72.3

[56] References Cited
UNITED STATES PATENTS

| | | |
|---|---|---|
| 3,431,739 | 3/1969 | Richardson et al. ............... 61/72.3 |
| 3,482,410 | 12/1969 | Roesky et al. ..................... 61/72.3 |
| 3,524,325 | 8/1970 | Brown ................................ 61/72.3 |
| 3,589,136 | 6/1971 | Sorenson et al. .................. 61/72.3 |
| 3,633,369 | 1/1972 | Lawrence .......................... 61/46.5 |

Primary Examiner—Mervin Stein
Assistant Examiner—David H. Corbin

[57] ABSTRACT

Temporary buoyancy is supplied to a submarine pipeline by connecting one or more sections of interconnected thin walled pipe members to a submarine pipeline such that a compressed gas may be supplied to the thin walled members enabling the net weight in water of combined pipes to be controlled to approximately zero. The compressed gas is ultimately replaced by water as a result of manipulations performed at the water surface.

8 Claims, 5 Drawing Figures

PATENTED SEP 17 1974 3,835,656
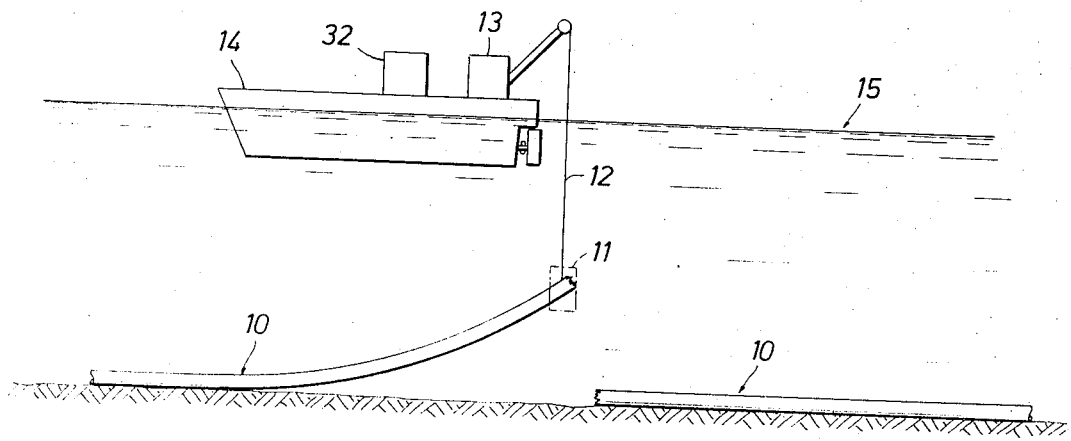
FIG. 1
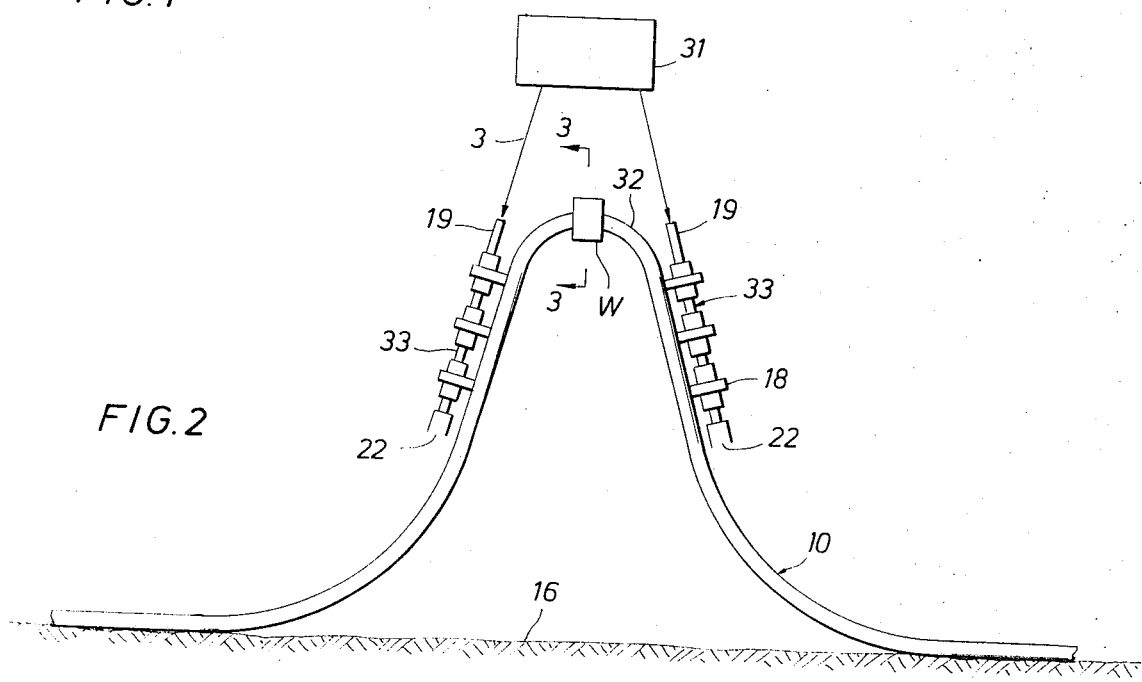
FIG. 2
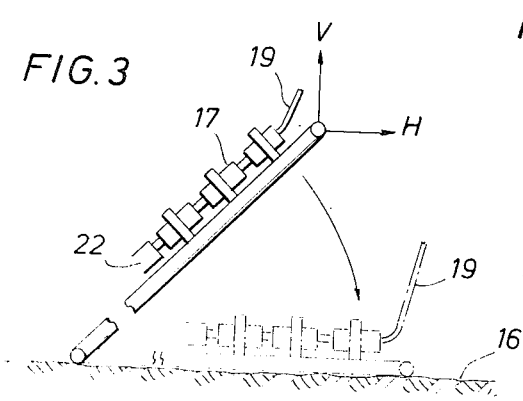
FIG. 3
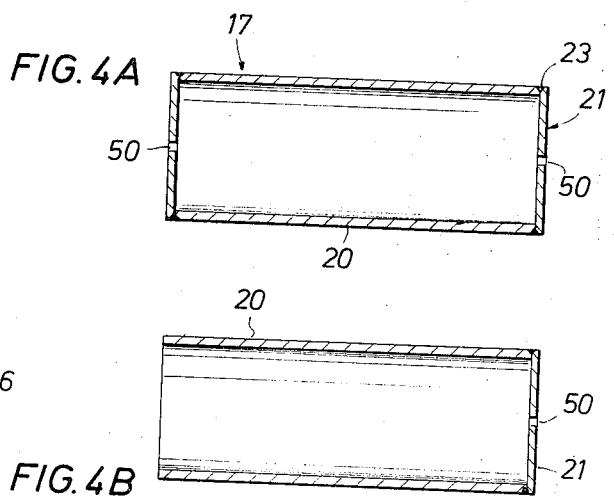
FIG. 4A
FIG. 4B

METHOD AND APPARATUS FOR SUPPLYING TEMPORARY BUOYANCY TO AN UNDERWATER PIPELINE

BACKGROUND OF THE INVENTION

1. Field of the Invention

The present invention relates to a method and apparatus for providing temporary buoyancy to a submarine pipeline during repair operations to a broken or damaged section of the pipeline.

2. Description of the Prior Art

Repairing of underwater or submarine pipelines using the slack loop method makes it essential to position the slack loop on the sea floor. To accomplish this when the pipe has a weight greater than zero (referred to water) requires that a horizontal force, parallel to the sea floor, be applied to the slack loop to prevent buckling of the pipe as it is lowered. Since conditions of the sea floor are not known with certainty, determining the horizontal force necessary to prevent the slack loop portion of the pipeline from buckling is difficult when the pipeline is lowered after effecting a repair. The difficulty of determining the horizontal force can be avoided if the pipe has zero weight in water, with, if necessary, the addition of extra buoyancy. Previous methods of providing temporary buoyancy to a pipeline during repair have the inherent and common disadvantage that is difficult to remove the temporary buoyancy after the pipeline repair has been completed and the pipeline has been returned to the ocean floor.

SUMMARY OF THE INVENTION

The present invention solves this difficult problem by attaching to the main pipeline a plurality of interconnected closed thin walled pipes having a diameter sufficient to control the relative weight of the combined pipes at approximately zero during lowering of the repaired pipeline.

Another principal advantage of the present invention is attained by providing the lowermost thin walled pipe section with an opening through which sea water may be admitted or expelled to control the buoyancy of the pipeline. By having a hose connected to the uppermost thin walled pipe section and in communication with the work vessel at the surface of the body of water sea water may be forced out or allowed to enter. After repair of the pipeline is completed and the pipeline is finally positioned on the sea floor, the thin walled pipe sections are completely filled with sea water eliminating the temporary buoyancy and aiding in stabilizing of the pipeline.

DESCRIPTION OF THE DRAWINGS

The nature of the present invention will be more fully appreciated with reference to the drawings in which:

FIG. 1 illustrates a method of retrieving an underwater pipeline;

FIG. 2 shows a slack loop repair with temporary buoyancy means of the present invention attached;

FIG. 3 is taken along line 3—3 of FIG. 2 and shows in addition the final step of lowering the slack loop to the sea floor; and FIGS. 4a and 4b show in cross-section the construction of the buoyancy member of the present invention.

DESCRIPTION OF A PREFERRED EMBODIMENT

Referring to the drawing and more particularly to FIG. 1, a submarine pipeline 10 is shown in the process of being repaired. The work vessel 14 floating on the body of water 15 is equipped with a conventional crane 13. The crane 13 is shown with a cable 12 which has a remotely operated grappling tool 11 at its lower end for engaging pipeline 10 enabling it to be raised to the surface to effect the repair. If the pipeline 10 is not severed, as a result of the damage, a complete separation must be made by, for example, a shaped charge cutter. Each section of pipeline 10 would be retrieved separately the first being buoyantly floated using suitable means (not shown) while the second portion is retrieved to the surface preparatory to repair. In the repair of submarine pipeline wherein it is raised from the floor 16 to the surface of the water 15, the pipeline naturally separates necessitating additional pipe at the surface to connect the two ends. The original pipe ends 10 and the additional pipe 32 then form a loop (the slack loop) which must then be returned to the floor 16.

The slack loop method embodies adding an additional section of pipe 32 (FIG. 2) to the pipeline 10 and subsequently lowering the pipeline 10 and the additional pipe 32 to the floor 16 while maintaining a constant upward tension force V (FIG. 3) and applying a force H in the horizontal direction while rotating the pipe such that the U-shape is parallel to the sea floor. Previous methods of repairing submarine pipelines using the slack loop method have the significant disadvantage of not being able to accurately determine the magnitude of the force required to be applied in H-direction. This is due to the inability to assess the condition of the sea floor 16 with certainty. If too large a horizontal force H is applied other parts of the pipeline 10 may be damaged by pulling the pipeline 10 along the floor 16 and encountering an obstruction thereby bending the pipeline 10. If too small a force H is applied the slack loop portion will tend to buckle requiring a second repair. In applying the slack loop method the U-shaped portion must be finally positioned on the sea floor 16. FIG. 3 illustrates the method by which this is accomplished. In a pipeline 10, as the U-shaped portion is lowered and positioned on the sea floor, the pipeline 10 will tend to twist about an axis on the centerline of the original pipe.

The present invention eliminates the uncertainty involved in determining magnitude of the horizontal force H by suitably attaching a plurality of connected buoyant members 17 (FIG. 2) to the slack loop portion of pipeline 10. The buoyant members 17 allow the relative weight of the combined pipes (17, 10 and 32) to be controlled from the surface by means of a high pressure gas source 31 connected to the buoyancy means 17 through high pressure hoses 19. The buoyancy members 17 are preferably made from thin walled tubular pipe members 20 closed at each end by end plate 21 secured to the pipe 20 by a circumferential weld 23. Each end plate 21 is provided with tapped hole 50 allowing a plurality of buoyancy members 17 to be interconnected using high pressure hoses 33 as the connecting means. In connecting each buoyancy member 17 to the slack loop portion of the pipeline 10, at least one strap 18 is used to attach each member 17 to the pipeline. In attaching the buoyancy member 17 to pipeline 10, the members 17 are attached after the pipeline 10 has passed through a constant tension apparatus onboard work vessel 14. Since there are numerous methods and apparatus for maintaining constant tension that are well known in the art, the operation of such a device will not be discussed herein.

During the process of attaching buoyancy members 17 so that they are substantially symmetrical with respect to each side of the middle of the additional pipe section 32, each member 17 is interconnected to the next adjacent member 17 on each side of slack loop 32 by a hose 33 with the lowermost member 17 on each side of slack loop 32 remaining open to the surrounding water (FIG. 4b) with the uppermost member 17 on each side of loop 32 being provided with a hose 19 extending to the surface of the water 15 and connected to high pressure gas source 31 onboard the vessel 14. The high pressure source 32 may be a conventional air compressor or it may be bottled inert gas or any other means of supplying high pressure gas to buoyancy members 17. The operating pressure must be sufficient to expel the water from the buoyancy pipe, and the maximum gas pressure will be equal to the water pressure at the maximum depth of the open end 22 of the buoyancy pipe. For example, if the open end 22 will ultimately be at a water depth of 1,000 feet the maximum gas pressure required will be 450 psi.

In applying the teachings of the present invention (FIG. 3), the horizontal force H required to be applied to twist the on-bottom pipe 10 is quite small and would be in a range of zero pounds force to a few hundred pounds force depending on such parameters as the water depth and the dimensions of the pipeline. If necessary, the weight W, which may vary from zero pounds to a few hundred pounds depending on the water depth and the pipe dimensions can be attached at the top of the slack loop for the purpose of supplying a moment to overcome the twisting resistance of the pipeline. The application of the horizontal force H using the method of the present invention is only required initially to displace the slack loop portion from a vertical plane. After rotation of the slack loop portion is initiated application of the horizontal force H is no longer required. Once the repaired pipeline is again positioned on the sea floor, the gas pressure is removed allowing sea water to flood the buoyancy members 17 substantially increasing the relative weight of the combined slack loop 32 and the buoyancy members 17 stabilizing the installation. Subsequent to positioning the repaired pipeline 10 on the sea floor 16 the hose 19 extending to the surface of water 15 may be removed from the buoyancy member 17, either by having a diver descend to the floor 16 to remove it or disconnect means may be provided at the connection of the hose 19 to member 17 such that by applying a tension force onboard work vessel 14, release of hose 19 is effected. In the alternative, the hose 19 may be left attached to the buoyancy member 17 and allowed to sink to the floor 16.

The method and apparatus of the present invention is equally adaptable for joining underwater pipelines that are being installed by pipelaying barges starting from different terminal locations and meeting at some common point located between the two terminals.

I claim as my invention:

1. Apparatus for supplying temporary buoyancy to an underwater pipeline while joining two sections of said pipeline, said apparatus comprising:
    at least one additional pipe section installed in end-to-end fluid communication between said two pipe sections;
    a plurality of selectively floodable and sinkable chamber-like buoyancy members suitably attached to said two pipe sections to be joined and symmetrically arranged on said pipe sections with respect to the middle of said additional side of pipe section;
    conduit means interconnecting said chamber-like buoyancy members, one end of said conduit means being of a length sufficient to extend to the surface of the water in which the pipeline is positioned; and
    pressurizing means connected to said conduit means whereby gas pressure may be supplied to said buoyancy members through said conduit means;
    the lowermost buoyancy member on each side of said additional pipe section having an opening to control the admission of surrounding water, the gas pressure supplied being sufficient to overcome the water pressure at the lowermost buoyancy member.

2. The apparatus of claim 1 wherein said buoyancy member comprises:
    a thin walled pipe member; and
    an end plate weldably attached to each end of said thin walled pipe member;
    said end plate having a tapped hole therethrough.

3. The apparatus of claim 1 wherein said conduit means is a high pressure hose.

4. The apparatus of claim 1 wherein said pressurizing means is an air compressor.

5. The apparatus of claim 1 wherein said pressurizing means is bottled inert gas.

6. A method of joining two sections of an underwater pipeline disposed on the floor of a body of water, said method comprising the steps of:
    raising a portion of said pipeline to the surface of the body of water;
    installing an additional section of pipe in said pipeline;
    attaching a plurality of selectively-floodable chamber-like buoyancy members to each side of the middle of said additional pipe section, said buoyancy members being interconnected by hose means, said hose means extending to the surface of said body of water; and
    lowering said pipeline, said additional pipe section, and said buoyancy members to the floor of said body of water while maintaining said additional pipe section and said buoyancy members at substantially neutral buoyancy.

7. The method of claim 6 further including the step of:
    flooding the buoyancy members by opening them to atmospheric pressure at the water surface.

8. The method of claim 6 further including, prior to the step of lowering said pipeline to the ocean floor, the step of attaching a weight member at the midpoint of said additional pipe section to supply a moment to overcome the twisting resistance of said pipeline.

* * * * *